United States Patent [19]
Russo

[11] 3,879,087
[45] Apr. 22, 1975

[54] CYCLE SEAT BACKREST
[76] Inventor: Gerard Russo, 2509 Gardi St., Duarte, Calif. 91010
[22] Filed: Oct. 12, 1973
[21] Appl. No.: 405,816

[52] U.S. Cl. ............... 297/195; 297/203; 297/352; 297/DIG. 9
[51] Int. Cl. ............................................. A47c 7/42
[58] Field of Search ...... 297/354, 195, 203, DIG. 9, 297/352, 460, 243

[56] References Cited
UNITED STATES PATENTS

| | | | |
|---|---|---|---|
| 371,402 | 10/1887 | Williamson | 297/460 X |
| 1,937,920 | 12/1933 | Smith | 297/460 |
| 2,307,709 | 1/1943 | Oofon | 297/460 |
| 2,613,722 | 10/1952 | Ruppert | 297/195 X |
| 2,613,723 | 10/1952 | Bryant | 297/DIG. 9 |
| 2,847,062 | 8/1958 | Henrickson | 297/460 |
| 3,258,290 | 6/1966 | Karbin | 297/203 X |
| 3,425,745 | 2/1969 | Michels | 297/195 |
| 3,712,670 | 1/1973 | Svchla | 297/195 |

Primary Examiner—Francis K. Zugel
Attorney, Agent, or Firm—Victor C. Muller

[57] ABSTRACT

Backrest for use with a cycle seat or saddle characterized by a member formed of sheet material, suitably contoured to provide requisite support for the back of a cycle rider, and means for securing same to portions of the seat without alterations thereto or the addition of any ancillary securing devices. Briefly, the securing means comprises a fulcrum resting on top of the seat and hook devices disposed fore and aft of the fulcrum and engaging a seat flange for preventing relative movement between the seat and backrest.

8 Claims, 6 Drawing Figures

PATENTED APR 22 1975　　　　　　　　　　　　3,879,087

3,879,087

CYCLE SEAT BACKREST

BACKGROUND OF THE INVENTION

In the cycling art, which includes the use of bicylces, motorcycles and other like vehicles, it has long been the practice to provide a seat or saddle for the cyclist upon which he is seated with his legs straddling portions of the vehicle, the vehicle handle bars providing steering control and also means for maintaining proper balance of the cyclist during the various vehicle maneuvers. As the art developed, seat backrests were added for comfort and other purposes, such type of accessory being exemplified by U.S. Pat. Nos. 998,330, 1,168,253, 3,425,745 and various others, particularly during circa 1910–1920. In this relatively early development, seats were constructed in various forms, with no particular standardization, and it was difficult to design a backrest which had generally uniform application to various seats. Another disadvantage of early backrests resides in their complicated construction, including brackets, bolts and other fittings.

SUMMARY OF THE INVENTION

Cycle seat backrest for use with a cycle seat of the type having a downturned flange extending about its periphery comprising: a pair of hooks engaging forward opposite portions of the flange and a hook engaging with the rear portion thereof, the hooks cooperating with an abutment on the backrest engageable with the top of the seat between the front hooks and the rear hook and providing a fulcrum about which the backrest tends to fulcrum in opposite directions when fore and aft forces are applied thereto, which tendency is resisted by the hooks. The backrest is preferably formed of sheet material, such as press formed sheet metal, built-up layers of woven fibreglass, impregnated with curable epoxy resin, thermo plastics, or injection moulded into a suitable mould. The hooks and their mountings may be similarly constructed and cemented, bolted, or riveted to the backrest or, depending upon the type of construction, may be integrally formed from the material forming the backrest. The backrest, together with its attached hooks, may be applied to the seat by merely moving it relative to the seat to its final position at which it is self-locking against unauthorized removal. It may be removed from the seat in similar manner. No ancilliary bolts, brackets or other fastenings are required to maintain it in its attached operative position on the seat.

DETAILED DESCRIPTION OF PREFERRED EMBODIMENTS

Figure 1:
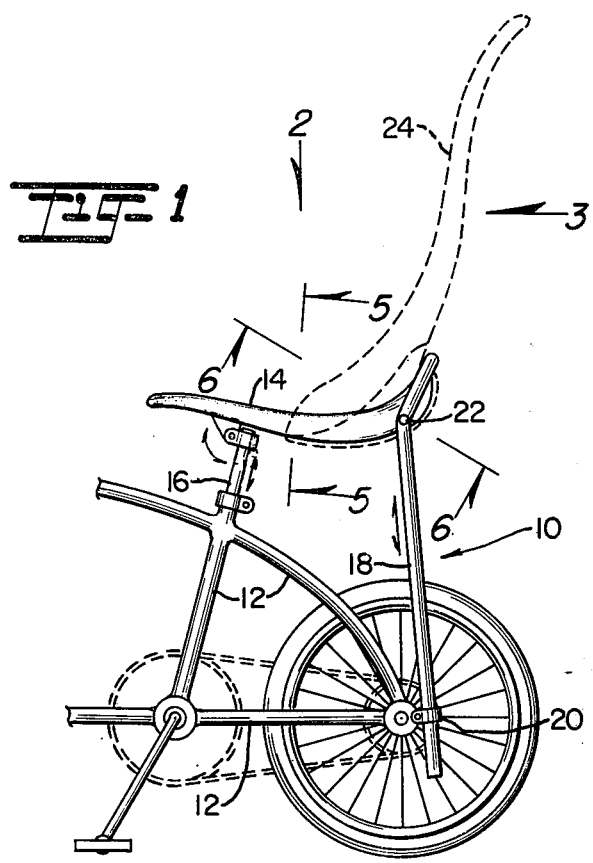
FIG. 1 is a side elevation of the rear portion of a bicycle, illustrating in dotted lines the position in which the subject invention backrest is applied to the seat thereof.

Referring now to the drawing, and first to FIG. 1, conventional bicycle 10 comprises a wheel supported frame 12 and seat or saddle 14 supported by seat post 16. Post 16 is vertically adjustable relative to the frame and seat 14 is angularly adjustable relative to post 16 as indicated by the arrows adjacent thereto, as is conventional in the art. As illustrated, seat 14 is of the considerably elongated type, generally referred to as a "banana" seat, often applied to a bicycle in lieu of its original seat which is usually considerably shorter in length than the banana seat. When using a banana seat it is also conventional to add support to same near its rear end by a U-shaped "sissy" bar 18. The sissy bar is also vertically adjustable and may be clamped to the rear ends of the frame by brackets 20, its upper portion being secured to the seat by bolts 22.

The subject of the invention comprises a seat backrest 24 formed of sheet material of sufficient vertical extent, as illustrated by dotted lines in FIG. 1, to support the back of the cyclist between his shoulders and below same. The central vertical section is generally S-shaped and the transverse cross sections are concave forwardly to fit the shape of the cyclist's back. As will be apparent from FIGS. 3 and 6, it widens somewhat near its lower end to conform to the shape of the rider's hips and buttocks which are disposed partially on the seat and partially supported by the backrest near its lower end. A rib or flange 26, curved in cross-section, extends around the outer edge of the backrest, between the points where its lower end joins or abuts the seat, to add strength to same and also to obviate any sharp edges which might otherwise cause discomfort to the cyclist. The lower central portion of the backrest is provided with a U-shaped cutout 28 which conforms to the cross sectional configuration of the seat and which will be subsequently described in more detail. As will be understood, the term "cyclist" as employed herein is intended to designate the person propelling or controlling the cycle (bicycle or motorcycle) as distinguished from a passenger or rider who may be carried in tandem behind the cyclist.

An important feature of the invention resides in the manner in which the backrest, previously described, is secured directly to the seat and without any alterations thereto or additions of any brackets, supports, bolts, or other accessories. Briefly, the backrest is manually forced onto the seat and its associated integral securing means engage parts of the seat and secure the backrest thereto, preventing relative motion therebetween when various forces are applied to the backrest.

Figure 3:
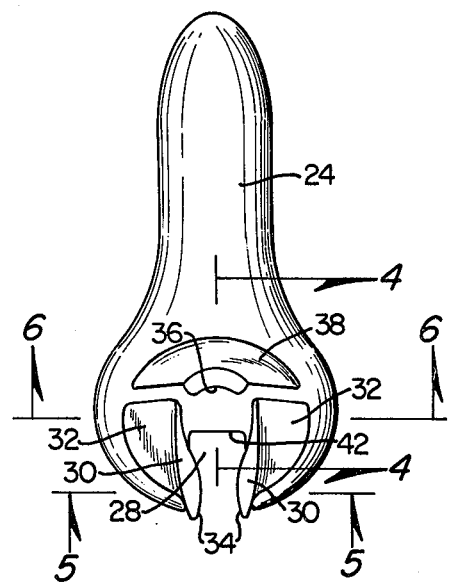
FIG. 3 is a rear elevation of the backrest as viewed in the direction of arrow 3, FIG. 1.

Referring now to FIG. 3, the securing means just referred to comprise: a pair of spaced flanges 30, 30, each forming a part of a flange support member 32 secured to the backrest; front hooks 34, 34 each formed from the forward portion of a flange; and a rear hook 36 formed from a hook support member 38 secured to the backrest.

Figure 4:
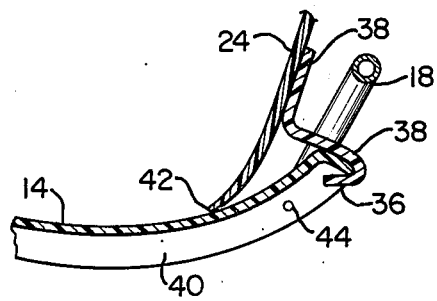
FIG. 4 is a section taken on line 4—4 FIG. 3.
Figure 2:
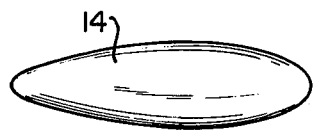
FIG. 2 is a top elevation of the bicycle seat as viewed in the direction of arrow 2, FIG. 1.
Figure 5:
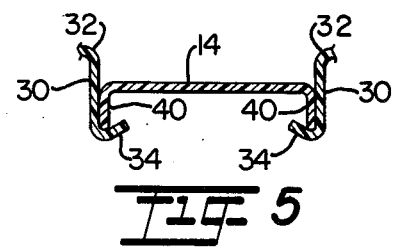
FIG. 5 is a section taken on line 5—5, FIG. 1.
Figure 6:
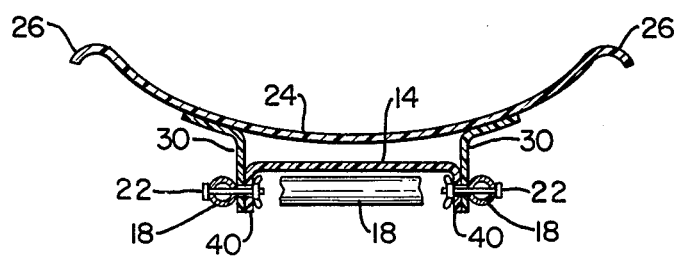
FIG. 6 is a section taken on line 6—6 FIGS. 1 and 3.

Referring now to FIG. 2, it is apparent that seat 14 increases in width from its rear end toward its front end, being of maximum width at about its midpoint. It then decreases in width and terminates in a curved point at its front end. Referring to FIGS. 4, 5 and 6, seat 14 is provided with a downturned flange 40 about its periphery. Padding is also applied to the upper surface of the seat, illustration of which has been omitted to simplify the drawing. The distance between flanges 30 (FIG. 3) increases in a direction from rear to front in the same manner as the seat (FIG. 2) so that when the flanges move forwardly relative to the seat the forward and outward taper thereof jam against the seat flanges when the backrest is moved to its final position. During this movement, hooks 34 underlie the lower edges of flange 40, and, when moved to final position, tightly engage same as illustrated in FIG. 5. Just prior to movement to final position, the backrest is rotated slightly rearward so that hook 36 will engage beneath the flange at the rear end of the seat. Its engagement in the final position is illustrated in FIG. 4. FIG. 6 illustrates the position of flanges 30 relative to seat flange 40 when applied to final position. It is also apparent that at this time edge 42, which forms an edge of cutout 28 (FIG. 3), now lies on top of the seat. The backrest is now firmly secured to the seat without further application of bolts or other securing devices.

The manner in which the backrest remains immovable with respect to the seat may be better understood upon consideration of the forces acting upon the backrest. First, it is apparent that flanges 30, 30 prevent lateral movement since they engage the opposite side surfaces of the seat. The normal force applied to the backrest is a rearward force when the cyclist leans rearwardly. When this occurs the backrest tends to pivot rearwardly about fulcrum edge 42 which engages the top surface of the seat. This produces an upward force on the seat adjacent forward hooks 34, which prevents rearward pivotal movement of the backrest. In the event a forward force is applied to the backrest (which is abnormal) the backrest tends to pivot forwardly about fulcrum edge 42 but this is resisted by rear hook 36. Rear hook 36 also serves as a limit stop to prevent forward translation of the backrest relative to the seat. As will be apparent, if the seat is relatively short in length and does not require a sissy bar support, the backrest will remain in its intended fixed position without any securing means other than the flanges and hooks previously described.

In the event the seat is of the banana type and requires a sissy bar, the bolts 22 which secure the upper end of the sissy bar to the seat flanges are removed and the sissy bar is swung rearwardly to permit the backrest to be applied to the seat. Thereafter, it is returned to its normal position and bolts 22 are reapplied, flanges 30 being provided with apertures 44 to receive the bolts, as illustrated in FIG. 6. While this construction may provide some incidental additional rigidity of the backrest relative to the seat, the principal purpose of the sissy bar is to support the somewhat lengthy rearward overhang of the seat relative to the seat post. Thus, the backrest may be employed with seats other than the banana type employing a sissy bar.

The backrest and the associated attaching flanges and hook members are preferably constructed of sheet material such as metal, thermo plastics, or resin reinforced fiber glass. In the former, the metal parts may be blanked and die formed to shape and secured together with rivets, welds or the like. In the latter, resin impregnated woven fibre glass may be laid on suitable forms and cured. Several layers of fibre glass will usually be required to develop the requisite strength. This construction is especially appealing to young cyclists since various fabrics, insignia, names and other designs may be laid on the outermost layer of fiber glass and cured beneath the surface of the resin. When used with a sissy bar, the bolts are preferably deformed or otherwise locked to prevent or deter unauthorized removal of the backrest. When used without a sissy bar, holes may be provided in the backrest side flanges and seat flange, through which like locking bolts may be disposed.

What is claimed is:

1. In a backrest for use with a saddle-like seat for a cycle, such as a bicycle or motorcycle, said seat having a top face of a shape upon which a rider may be seated with legs of the rider straddling the forward end thereof, said face being symmetrical with respect to its central longitudinal axis, said seat having a downwardly turned flange at opposite sides thereof, comprising:
   a. said backrest having a lower edge adapted to rest on said top face at a locus forwardly from the rear end of the seat and transverse to said longitudinal axis to provide a fulcrum;
   b. a pair of downwardly extending side hooks secured to a lower portion of the backrest, one at each side of said axis, each side hook adapted to engage beneath a corresponding flange at the sides of the seat and at a locus forwardly from said lower edge, whereby a rearward force on the backrest produces a moment about said fulcrum which is resisted by upward forces applied by said hooks to the flanges; and
   c. other means affixed to the backrest for securing it to the seat at a locus rearwardly of said fulcrum and so constructed to resist a moment about said fulcrum produced by a forward force applied to the backrest, said other means also preventing forward movement of the backrest relative to the seat;
   d. the position of said fulcrum being sufficiently near the rear end of the seat to permit the rider to be seated directly thereon in substantially the same position as in the absence of the backrest, whereby the seat serves its original purpose and the backrest serves its added purpose;
   e. said side hooks being spaced in such manner that they engage beneath the corresponding flanges when the backrest is slid forwardly onto the seat to the position where said lower edge forms said fulcrum.

2. A backrest in accordance with claim 1 wherein said seat is provided with a like flange at the rear end thereof, and, said other means comprises a downwardly extending hook engageable beneath said like flange.

3. A backrest in accordance with claim 1 wherein the backrest is formed of sheet material and extends upwardly and rearwardly from the fulcrum edge a sufficient distance to engage the back of the rider between the shoulders thereof; the central vertical section thereof is generally S-shaped; and sections transverse to said central section are concave at loci engaging the back of the rider.

4. A backrest in accordance with claim 3 including an integral flange formed of said sheet material extending around the edge of the backrest for reinforcing same.

5. A backrest in accordance with claim 1 including a pair of downwardly extending spaced flanges secured to the lower portion of the backrest, each adapted to lie against a side seat flange in loci between the hooks and fulcrum edge.

6. A backrest in accordance with claim 5 wherein said downwardly extending spaced flanges diverge in the forward direction to conform and wedge against seat side flanges having like divergence.

7. A backrest in accordance with claim 2 wherein the seat is of the elongated banana type supported near its rear end by a U-shaped sissy bar having a bight portion disposed above the rear portion of the seat, the backrest adapted to be affixed to the seat by first disconnecting the sissy bar from the seat, sliding the backrest forwardly onto the seat to thereby connect its hooks to the seat flanges, and thence reconnecting the sissy bar to the seat, said bight portion then being disposed behind the backrest and preventing removal of the backrest from the seat when the sissy bar is reconnected to the seat.

8. A backrest in accordance with claim 2 wherein the backrest is formed of sheet material and extends upwardly and rearwardly from the fulcrum edge a sufficient distance to engage the back of the rider between the shoulders thereof; the central vertical section therof is generally S-shaped; sections transverse to said central section are concave at loci engaging the back of the rider; an integral flange formed of said sheet material extending around the edge of the backrest for reinforcing same, a pair of downwardly extending spaced flanges secured to the lower portion of the backrest, each adapted to lie against a side seat flange in the loci between the side hooks and fulcrum edge, the last named flanges diverging in the forward direction to conform and wedge against seat side flanges having like divergence.

* * * * *